United States Patent
Batterywala

(10) Patent No.: US 8,019,799 B1
(45) Date of Patent: Sep. 13, 2011

(54) COMPUTER SYSTEM OPERABLE TO AUTOMATICALLY REORGANIZE FILES TO AVOID FRAGMENTATION

(75) Inventor: Yusuf Batterywala, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 2169 days.

(21) Appl. No.: 10/822,475

(22) Filed: Apr. 12, 2004

(51) Int. Cl.
    *G06F 17/30* (2006.01)
(52) U.S. Cl. ........................ 707/822; 707/823
(58) Field of Classification Search .................. 707/642, 707/645, 646, 696, 708, 758, 802, 812, 822, 707/823, 829
    See application file for complete search history.

(56) References Cited

U.S. PATENT DOCUMENTS

| | | | |
|---|---|---|---|
| 5,778,392 A * | 7/1998 | Stockman et al. | ............ 707/205 |
| 5,930,828 A | 7/1999 | Jensen et al. | |
| 6,070,172 A | 5/2000 | Lowe | |
| 6,397,311 B1 | 5/2002 | Capps | |
| 6,571,261 B1 | 5/2003 | Wang-Knop et al. | |
| 6,640,233 B1 * | 10/2003 | Lewis et al. | .................... 707/205 |
| 6,735,678 B2 | 5/2004 | Noble et al. | |
| 6,745,311 B2 | 6/2004 | Fabrizio et al. | |
| 7,788,460 B2 * | 8/2010 | Rothman et al. | .............. 711/170 |

* cited by examiner

*Primary Examiner* — Charles Rones
*Assistant Examiner* — Fariborz Khoshnoodi
(74) *Attorney, Agent, or Firm* — Meyertons, Hood, Kivlin, Kowert & Goetzel, P.C.

(57) ABSTRACT

A system and method for automatically reorganizing files to avoid the problem of file fragmentation. At an appropriate time, such as when an I/O request to write to a file is received, the file may be marked as possibly being in need of reorganization. The system may later determine that the file was marked for possible reorganization and may examine the file to determine whether the file is actually in need of reorganization, i.e., whether the file is fragmented. If so, then the file may be automatically reorganized to eliminate the fragmentation. In another embodiment, files may first be checked to determine whether they are actually in need of reorganization before being marked. The method may benefit a computer system by automatically detecting and reorganizing fragmented files on an individual file basis.

21 Claims, 3 Drawing Sheets

Computer System

COMPUTER SYSTEM OPERABLE TO AUTOMATICALLY REORGANIZE FILES TO AVOID FRAGMENTATION

BACKGROUND OF THE INVENTION

1. Field of the Invention

This invention relates to computer systems and file storage systems. More particularly, the invention relates to a system and method for automatically reorganizing selected files to alleviate the problem of fragmentation.

2. Description of the Related Art

Computer systems use file systems to organize and store a collection of files. In different systems, files may be stored or distributed in different ways. For example, in a simple standalone personal computer system, files are generally stored on one or more disk drives of the computer system. In a more complex cluster environment, files may be distributed over multiple computer systems or mass storage devices.

Each file in the file system may be represented on a disk drive or other storage device as a plurality of data blocks. It is generally desirable for the data blocks of each file to be stored contiguously with respect to each other on a storage device. When the data blocks of a file are contiguous, input/output (I/O) operations can access the file more efficiently. However, as I/O write operations occur, files tend to become fragmented over time. For example, when new data needs to be added to a file, the computer system may allocate new data blocks in which to store the new data. Oftentimes, the new data blocks are not allocated contiguously with the existing data blocks of the file, causing the file to become fragmented.

A file system in which many files are fragmented may result in a significant performance decrease for both I/O operations that access existing files and I/O operations that create new files. Previous approaches for dealing with the problem of fragmentation have involved performing defragmentation operations in which all or a portion of the file system is defragmented in mass. This may involve performing an intensive operation to analyze the file system to determine the areas of fragmentation and to reorganize many files to eliminate the fragmentation.

The amount of time that such a mass defragmentation operation takes may depend on several factors, including the size of the volume, the number and size of files on the volume, the amount of fragmentation, and the available system resources. In general, the mass defragmentation operation is very costly and can significantly interfere with other tasks executing on the computer system. In addition, such a defragmentation operation is generally not performed until a human intervenes, e.g., until a system administrator issues a command causing the mass defragmentation operation to be performed. Thus, files remain in a fragmented state until the mass defragmentation operation is invoked by request.

SUMMARY

According to one embodiment of a method for automatically reorganizing files to avoid the problem of file fragmentation, an I/O request for accessing a first file may be received, and the first file may be marked for reorganization in response to the I/O request. In various embodiments, the first file may be marked for reorganization in response to an I/O request of any kind. In one embodiment, the I/O request may comprise a write request. In particular, in one embodiment the I/O request may comprise an allocating write request, i.e., an I/O request that involves allocating additional space for the first file, e.g., to write new data into newly allocated data blocks.

The method may further comprise determining that the first file was marked for reorganization, subsequently to marking the first file. The first file may then be reorganized, e.g., by arranging data blocks of the first file so that the data blocks are contiguous with respect to each other.

In one embodiment, marking the first file for reorganization may comprise indicating that the first file is possibly, but not necessarily, in need of reorganization. In this embodiment, the method may also comprise determining whether the first file is actually in need of reorganization, after determining that the first file was marked for reorganization. The first file may be reorganized if the method determines that the first file is in fact in need of reorganization, i.e., is fragmented.

In another embodiment, the method may first check to see whether the first file is actually in need of reorganization before marking the first file for reorganization. Thus, the first file may not be marked for reorganization if the first file is not in need of reorganization, i.e., is not fragmented. In this embodiment, once the first file is identified as a marked file, the system may proceed to reorganize the first file without first checking to see whether it is actually in need of reorganization, since this check was already performed before marking the first file.

BRIEF DESCRIPTION OF THE DRAWINGS

A better understanding of the invention can be obtained when the following detailed description is considered in conjunction with the following drawings, in which.

Figure 1:
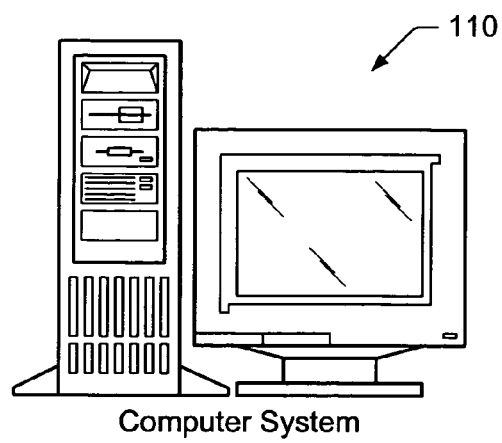
FIG. 1 illustrates one embodiment of a computer system that is operable to automatically and selectively reorganize files.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a computer system 110 that is operable to automatically and selectively reorganize files. As discussed above, data blocks in a file may become fragmented over time, which can reduce the efficiency of I/O operations performed on the file. The computer system 110 may be operable to reorganize individual files that have been identified or marked as being in need of reorganization, i.e., may reorganize the files to alleviate the problem of data block fragmentation. Exemplary techniques for automatically and efficiently identifying files that are in need of reorganization are discussed in detail below.

In one embodiment the files reorganized by the computer system 110 may be located or stored on the computer system 110. For example, the files may be stored on a storage device of the computer system 110, such as a disk drive or other device. In one embodiment the files reorganized by the computer system 110 may be local to the computer system 110, e.g., may be stored in a local file system for the computer system 110. In this embodiment, the files may not be shared by other computer systems, and the computer system 110 may be wholly responsible for automatically identifying which files are in need of reorganization and automatically reorganizing the files.

Figure 2:
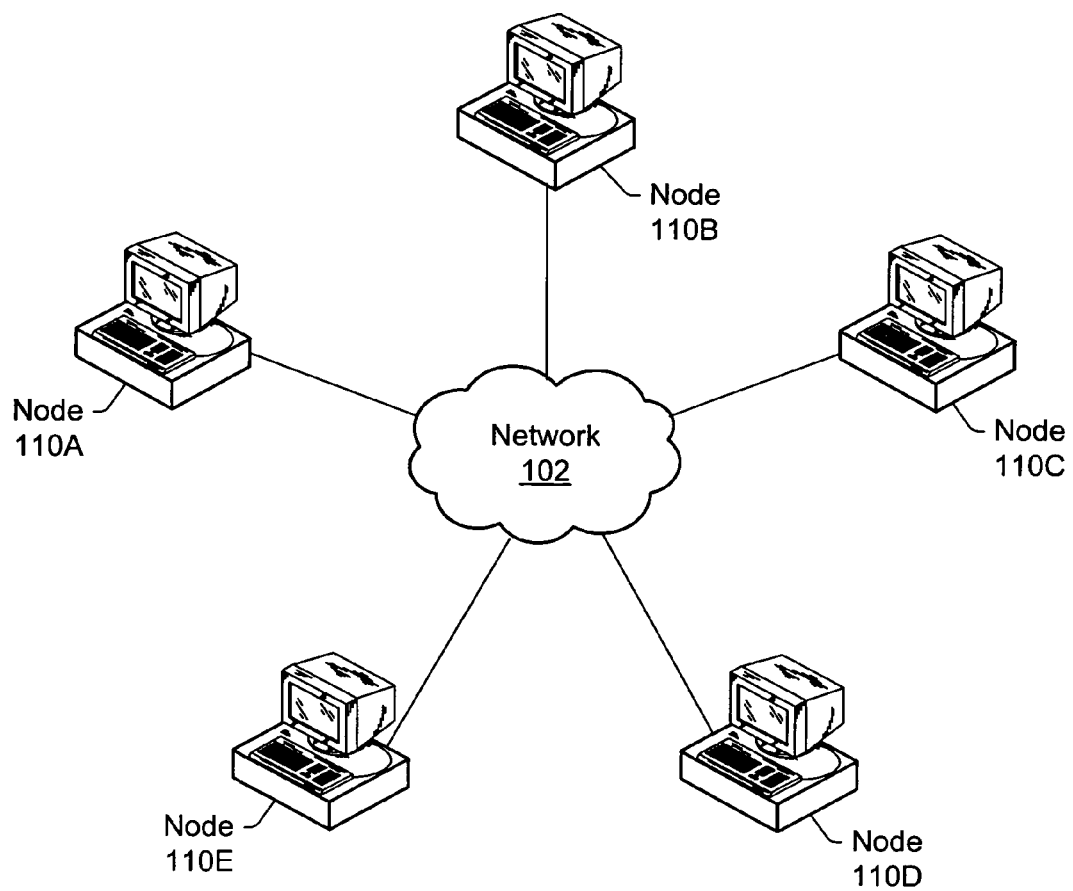
FIG. 2 illustrates an exemplary cluster environment in which a plurality of computer systems are coupled via a network.

In another embodiment the computer system 110 may operate in a cluster environment in which the files reorganized by the computer system 110 are shared or accessible by multiple computer systems. FIG. 2 illustrates an exemplary cluster environment in which a plurality of computer systems (nodes 110A-110E) are coupled via a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In the exemplary cluster environment of FIG. 2, the computer system 110 illustrated in FIG. 1 may embody any of the nodes 110A-110E. In one embodiment the files reorganized by the computer system 110 may be located or stored on another computer system in the cluster. For example, if the computer system 110 is node 110A then node 110A may be operable to reorganize files stored on node 110B (or node 110A may initiate or manage the reorganization of files stored on node 110B). In another embodiment, node 110A may be operable to reorganize files stored on a storage device shared by multiple nodes in the cluster environment.

As noted above, the files reorganized by the computer system 110 may comprise files previously identified or marked as files in need of reorganization. In a cluster environment such as that of FIG. 2, the files reorganized by the computer system 110 (e.g., node 110A) may have been identified or marked as being in need of reorganization by any node in the cluster. As one example, node 110A may be operable to reorganize files marked by one or more of nodes 110B-110C. As another example, the files reorganized by node 110A may include one or more files marked by node 110A itself. In various embodiments, any of various nodes in a cluster environment may be operable to automatically identify or mark files as being in need of reorganization. Also, any of various nodes in the cluster environment may be operable to automatically reorganize (or automatically initiate or manage the reorganization of) the marked files.

Figure 3:
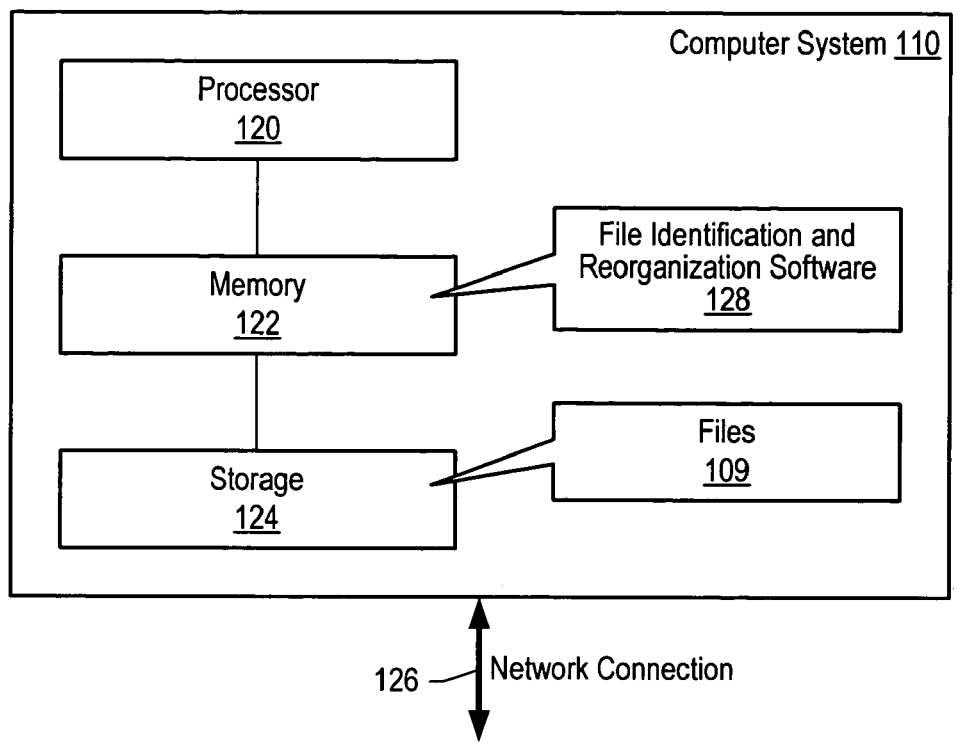
FIG. 3 illustrates one embodiment of the computer systems of FIGS. 1 and 2.

Referring now to FIG. 3, a diagram of one embodiment of the computer system 110 is illustrated. FIG. 3 may also represent any of the nodes 110 in the cluster environment of FIG. 2. Generally speaking, the computer system 110 may include any of various hardware and software components. In the illustrated embodiment, the computer system 110 includes a processor 120 coupled to a memory 122, which is in turn coupled to a storage device 124. The computer system 110 may also include a network connection 126 through which the computer system 110 couples to a network, such as the network 102 discussed above. The network connection 126 may include any type of hardware for coupling the computer system 110 to the network 102, e.g., depending on the type of computer system 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the computer system 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a stable or non-volatile manner. In one embodiment, the storage 124 may include non-volatile memory, such as magnetic media, e.g., one or more hard drives. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID).

As shown in FIG. 3 and discussed above, in one embodiment the storage 124 may store one or more files 109. Any number of files 109 may be stored in the storage 124, and the files 109 may include files of any kind. During operation of the computer system 110, various of the files 109 may be automatically identified or marked as being in need of reorganization and may subsequently be automatically reorganized as described below.

In one embodiment the memory 122 may store file identification and reorganization software 128. In one embodiment the file identification and reorganization software 128 may be executable by the processor 120 to identify and mark files 109 that are in need of reorganization (or files that are possibly in need of reorganization, as described below). Where the computer system 110 operates in a cluster environment such as described above with reference to FIG. 2, the file identification and reorganization software 128 may be operable to identify and mark for possible reorganization the files 109 that are stored in one or more storages 124 associated with other nodes.

The file identification and reorganization software 128 may also be executable by the processor 120 to perform reorganization operations to automatically reorganize files 109 that have been marked for reorganization, e.g., where the files 109 are stored either in the storage 124 of the computer system 110 or in one or more storages 124 of other nodes. Exemplary operations performed by the file identification and reorganization software 128 according to one embodiment are described in detail below.

It is noted that in various embodiments the file identification and reorganization software 128 may be implemented or architected in any of various ways. For example, in one embodiment the file identification and reorganization software 128, or portions of the file identification and reorganization software 128, may be modularized with respect to other software executing on the computer system 110. In another embodiment the file identification and reorganization software 128, or portions of the file identification and reorganization software 128, may be integrated with other software modules. For example, in one embodiment an operating system kernel may be responsible for implementing at least a portion of the functionality of the file identification and reorganization software 128. In one embodiment the file identification and reorganization software 128 may be organized into multiple modules that collectively perform the functionality described herein.

Figure 4:
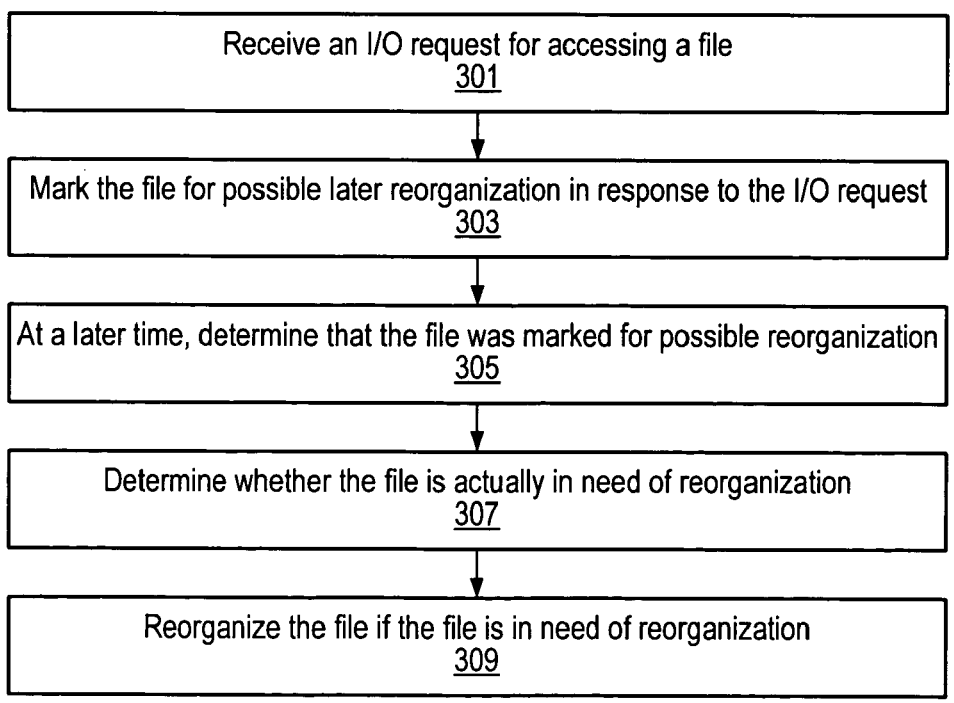
FIG. 4 is a flowchart diagram illustrating one embodiment of a method for automatically and selectively reorganizing files.

FIG. 4 is a flowchart diagram illustrating one embodiment of a method for automatically and selectively reorganizing files. It is noted that FIG. 4 illustrates a representative embodiment, and alternative embodiments are contemplated. Also, various elements may be combined, omitted, or performed in different orders.

In 301, an I/O request for accessing a file may be received. In 303, the file may be marked for possible later reorganization in response to the I/O request. For example, the file identification and reorganization software 128 discussed above may be responsible for monitoring I/O requests and marking files accessed by the I/O requests for possible later reorganization.

In various embodiments, the file may be marked for possible later reorganization in response to an I/O request of any kind. In one embodiment, the I/O request may comprise a write request. In particular, in one embodiment the I/O request may comprise an allocating write request, i.e., an I/O request that involves allocating additional space for the file, e.g., to write new data into newly allocated data blocks. Allocating new data blocks for the file may cause the file to become fragmented because the new data blocks may not be allocated contiguously with the existing data blocks of the file. Thus the file may be marked so that it can later be examined to determine whether the allocating write request caused the file to become fragmented. If so, then the file may be reorganized to eliminate the fragmentation, as described below. Since I/O requests that do not involve allocating new data blocks for a file do not cause the file to become fragmented, in one embodiment files may not be marked for possible later reorganization in response to I/O requests other than allocating write requests.

In various embodiments the file may be marked for possible later reorganization in any desired way. Marking the file may comprise storing information in memory and/or on stable storage (e.g., a disk drive) to indicate that the file has been marked. If the information is stored on stable storage of a computer 110 then, in the event of a crash, the file may remain marked when the computer 110 is restarted. In one embodiment, files may first be marked in memory, and information indicating that the files are marked may only be occasionally committed to stable storage to reduce the cost of accessing the stable storage.

In one embodiment, marking the file for possible later reorganization may comprise modifying a data structure or descriptor that represents the file, e.g., to store information in the data structure or descriptor to indicate that the file needs to be examined for possible reorganization. For example, in some systems, each file may have an inode that stores information about the file. In one embodiment, marking the file for possible later reorganization may comprise setting a flag in the file's inode to indicate that the file needs to be examined for possible reorganization. In another embodiment, a list of files that need to be examined for possible reorganization may be maintained. The list may be maintained in memory and/or on stable storage. In this embodiment, marking the file for possible later reorganization may comprise adding the file to the list.

In one embodiment the I/O request received in 301 may originate from a computer 110, and the file accessed by the I/O request may be stored on a storage device 124 of the same computer 110. In this embodiment, the file identification and reorganization software 128 may execute on the computer 110 to mark the file for possible reorganization. The file identification and reorganization software 128 may store information in the memory 122 of the computer 110 and/or on the storage device 124 of the computer 110 to indicate that the file has been marked, as discussed above.

In another embodiment, the I/O request received in 301 may originate from a first computer 110A, and the file accessed by the I/O request may be stored on a storage device 124 of a different computer 110B. File identification and reorganization software 128 may execute on either the computer 110A or the computer 110B to mark the file for possible later reorganization, depending on the particular implementation for monitoring I/O requests and marking files. In one embodiment, marking the file for possible later reorganization may be the responsibility of file identification and reorganization software 128 executing on the computer system on which the file is located, i.e., the computer 110B in this example. Also, in various embodiments, marking the file for possible later reorganization may comprise storing information in the memory 122 and/or on the storage device 124 of either the computer 110A and/or the computer 110B. In one embodiment, the information indicating that the file is marked may be stored on the computer system on which the file is located, i.e., the computer 110B in this example.

After the file is marked in 303, the system may later determine that the file was previously marked for possible reorganization, as indicated in 305. Determining that the file was previously marked for possible reorganization may be a function of the file identification and reorganization software 128. In a cluster environment such as illustrated in FIG. 2, file identification and reorganization software 128 executing on any computer (node) 110 in the cluster may be operable to detect that the file was previously marked for possible reorganization. In one embodiment, each computer 110 in the cluster may be responsible for files stored on that computer 110 to determine which of the files have been marked for possible reorganization. Thus, for example, if the file is stored on a computer 110B in the cluster environment, then file identification and reorganization software 128 executing on the computer 110B may be responsible for determining that the file was previously marked for possible reorganization.

In another embodiment, the file may be stored on a computer 110B in the cluster environment, and file identification and reorganization software 128 executing on a computer other than the computer 110B may determine that the file was previously marked for possible reorganization. For example, in one embodiment the detection of files that have been marked for possible reorganization may be performed in a centralized manner by one or more computers in the cluster that are configured to handle this responsibility.

The technique used to discover files that have been marked may depend on the technique used to mark the files. For example, where files are marked by setting flags in their respective inodes, the system may be operable to examine the inodes to determine whether the flags have been set. As another example, where files are marked by adding them to a list, the system may be operable to traverse the list to determine which files are included in the list.

Once the system determines that a file was previously marked for possible reorganization, the file (or information regarding the file) may be examined to determine whether the file is actually in need of reorganization, as indicated in 307. For example, block map (bmap) or other file system information regarding the file may be programmatically examined to determine whether there are non-contiguous blocks in the file, i.e., to determine whether the file is fragmented. For example, as discussed above, the file may have previously been marked for possible reorganization in response to an allocating write request that caused new data blocks for the file to be allocated non-contiguously with respect to previously existing data blocks of the file or allocated non-contiguously with respect to each other.

In one embodiment, if the file is fragmented at all then the system may determine that the file is in need of reorganization. In another embodiment, the system may utilize threshold criteria so that the file is only determined to be in need of reorganization if the file is fragmented above a certain threshold level. In various embodiments any desired algorithm, heuristic, or threshold criteria may be utilized to determine whether the file is fragmented above the threshold level. In one embodiment an administrative tool may be provided so that an administrator of the system can set options affecting the criteria or algorithm for determining whether files are in need of reorganization.

Determining whether the file is in need of reorganization may be a function of the file identification and reorganization software 128. Similarly as discussed above, in a cluster environment, file identification and reorganization software 128 may execute on any of various computers 110 in the cluster to determine whether the file is in need of reorganization, or file identification and reorganization software 128 executing on multiple computers 110 in the cluster may coordinate to make this determination. In one embodiment the same computer 110 that determines that the file was previously marked for possible reorganization may also determine whether the file is actually in need of reorganization. In another embodiment these functions may be performed by different computers 110. For example, in one embodiment file identification and reorganization software 128 executing on a computer 110A may determine that a file stored on a computer 110B was previously marked for possible reorganization and may request file identification and reorganization software 128 executing on the computer 110B to examine the file to determine whether the file is actually in need of reorganization.

In 309, the file may be reorganized if the file is determined to be in need of reorganization. Reorganizing the file may comprise rearranging data blocks of the file so that the blocks are contiguous. Reorganizing the file may be a function of the file identification and reorganization software 128. In a cluster environment, the file identification and reorganization software 128 that performs the file reorganization may execute on any of various computers 110 in the cluster, or file identification and reorganization software 128 executing on multiple computers 110 may coordinate to reorganize the file. In one embodiment file identification and reorganization software 128 executing on a computer 110 on which the file is stored may be responsible for reorganizing the file.

In one embodiment the file may only be reorganized if the file is currently inactive. For example, the system may be operable to track I/O activity for files to determine whether they have been recently accessed by an input/output operation. If the file has recently been accessed then it is likely that it will soon need to be accessed again (or the file may be currently being accessed). Thus, in this case the file may not be reorganized, in order to avoid interfering with input/output operations that need to access the file. Instead, the file may remain marked so that it can be reorganized at a later time when the file is inactive. For example, as described below, the system may be operable to periodically check for and reorganize marked files. In one embodiment, a system administrator may be able to specify options affecting how long a file needs to be inactive before it can be reorganized.

In another embodiment, files may first be checked to see if they are actually in need of reorganization before being marked. Thus, 307 may essentially be performed before 303. For example, after an allocating write operation for a file occurs, the system may check to see whether new data blocks for the file were allocated contiguously with the existing data blocks. If so, then the file may not be marked for reorganization. Thus, in this embodiment, once a file is identified as a marked file, the system may proceed to reorganize the file without first checking to see whether it is actually in need of reorganization, since this check was already performed before marking the file. In some systems it may be possible to take advantage of block map information that is read at the time the write operation occurs so that the block map information can be checked at this time to determine whether the file should be marked for reorganization. In other systems it may be desirable to mark the file for possible reorganization and delay the check until later, as described above. This may allow the write operation to complete faster.

As described above, files may be marked for possible reorganization, and the system may at some later time discover these files and reorganize them if necessary. In various embodiments the functionality of discovering files that have been marked may be implemented in any desired way. For example, in one embodiment a thread or process associated with the file identification and reorganization software 128 may periodically execute to check for files that have previously been marked. In a cluster environment, such a thread may execute on one or more of the computers 110 in the cluster. For example, in one embodiment each computer 110 that stores files may periodically execute a thread to check for files stored on that computer 110 that have been marked for possible reorganization. In another embodiment the discovery of marked files may be more centralized. For example one or more computers 110 in the cluster may be operable to discover marked files that are stored locally on the computer as well as other marked files stored remotely on other computers 110.

In various embodiments any of various criteria may be utilized to determine when a thread executes to discover marked files. For example, in one embodiment such a thread may simply execute at regular periodic intervals. Any desired time interval may be utilized. For example, a thread may be scheduled to execute to discover marked files every hour if desired. In another embodiment an administrator of the system may specify specific times at which to check for marked files. In another embodiment, system activity may be taken into account so that the thread only executes if the system is relatively idle. For example if the system is under a heavy processor or input/output load then execution of the thread may be delayed until the load decreases so that the process of discovering marked files and then reorganizing the files occurs in the background and does not interfere with other system activities. In one embodiment an administrative tool may be provided so that an administrator of the system can set a time period or other options affecting when to check for and reorganize marked files. In one embodiment the administrative tool may allow the administrator to manually trigger the reorganization of files that already have been marked previously.

In one embodiment, a thread or process that discovers a marked file may also be operable to determine whether the file is in need of reorganization and, if so, reorganize the file. In another embodiment, a separate thread may be spawned to determine whether the file is in need of reorganization and perform the reorganization if necessary. Where multiple files have been marked for possible reorganization, the files may be examined and reorganized either serially or in parallel. For example, in one embodiment a single thread may be operable to examine and reorganize multiple files in a serial manner. In another embodiment a separate thread may be spawned for each marked file, and the multiple threads may examine and reorganize the files in parallel with each other.

In another embodiment, rather than marking files and later checking for marked files as described above, other techniques may be used. For example, in one embodiment when a file is identified as being in possible need of reorganization (e.g., in response to an allocating write operation performed on the file), a task may be scheduled to examine and reorganize that file at a later time. In one embodiment the task may be scheduled to execute soon after the file is identified as being in possible need of reorganization.

In one embodiment the system may be configured to not reorganize certain files. For example, an administrator may be able to use a configuration tool to specify one or more files to not be automatically reorganized, or the system may be configured to not automatically reorganize certain types of files. As one example, files that have extending writes only (i.e., new data is always appended to the end of the file) may not be automatically reorganized. For example, it may not be desirable to automatically reorganize log files, since information is generally appended onto the end of them, and they may be read from relatively rarely. Thus, automatically reorganizing these files may consume system resources but may not result in a significant benefit.

As noted above, in one embodiment an administrative tool may be provided to allow a system administrator to specify various options affecting the automatic file reorganization described above, e.g., by utilizing a graphical user interface. The tool may also allow the administrator to turn the automatic file reorganization on and off as desired. In one embodiment turning off the automatic file reorganization may cause the system to stop monitoring I/O requests and marking files in response to the requests. Turning off the automatic file reorganization may also cause the system to stop checking for marked files. In one embodiment an ioctl system call or other API call may be provided to turn the automatic file reorganization on and off.

The method described above may benefit a computer system by automatically detecting and reorganizing fragmented files on an individual file basis. At an appropriate time, such as when an I/O request to access a file is received, the file may be marked as possibly being in need of reorganization. Individual files that have been marked may subsequently be examined and reorganized if necessary. Thus, files may be marked on a continual basis, and files that have been marked may periodically be automatically reorganized as described above. In various systems, automatically reorganizing only those files that have been identified as being fragmented may result in significant benefits over previous file system reorganization methods. For example, the significant overhead involved in reorganizing files in mass can be avoided. Also, individual files may be automatically reorganized as necessary on a relatively continual basis, rather than waiting for mass defragmentation jobs to be performed.

In an alternative embodiment of the method, when a file is reorganized, one or more files in the vicinity may also be reorganized. For example, suppose that a file marked for reorganization falls within a particular region on a disk drive. When the file is reorganized, other files in the disk drive region may also be reorganized in some cases.

In one embodiment, multiple files in a region may be reorganized in this manner so that files that were originally contiguous with respect to each other remain contiguous after the reorganization.

Figure 5A:
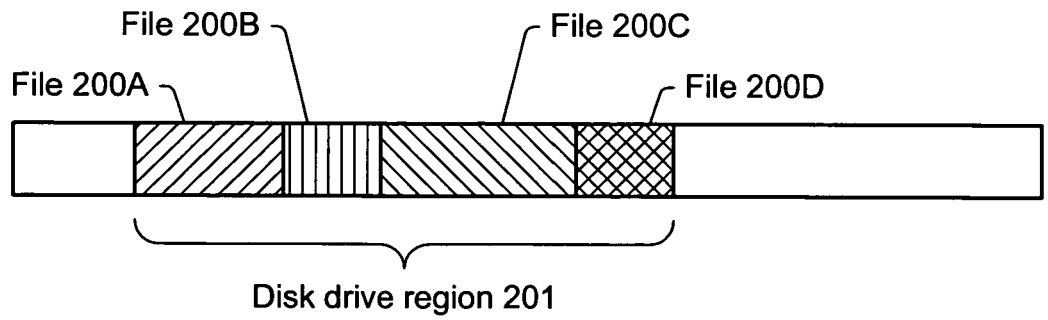
FIGS. 5A-5C illustrate an example in which multiple files within a disk drive region are automatically reorganized.
Figure 5B:
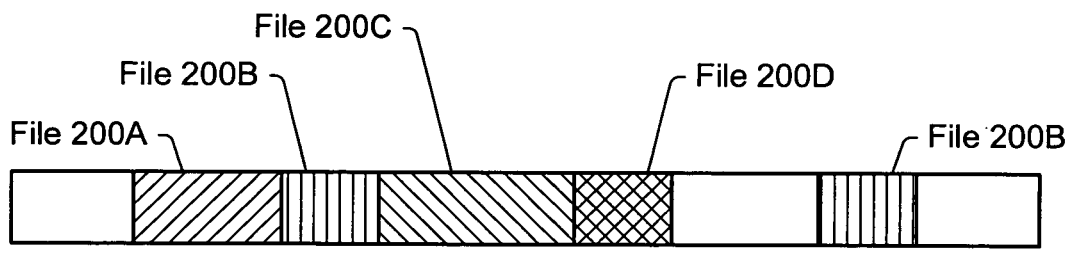
Figure 5C:
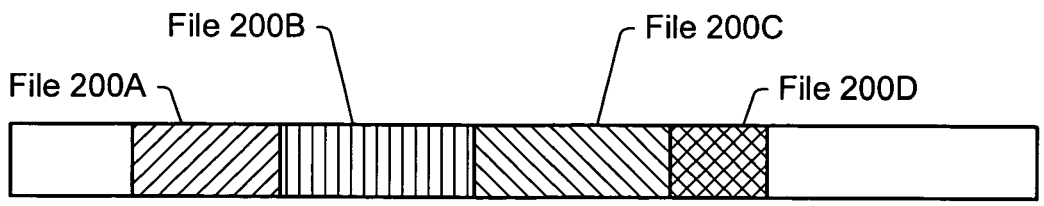

For example, FIG. 5A illustrates a simple example in which four files 200A-200D fall within a disk drive region 201. (Each file is represented by a different fill pattern in the drawing.) Suppose that an allocating write operation for file 200B then causes file 200B to become fragmented. For example, additional data blocks for file 200B may be allocated outside the disk drive region 201, as shown in FIG. 5B. In reorganizing the file 200B, the system may search for a contiguous space in which to place all the data blocks of file 200B. It is possible that moving data blocks of file 200B to this contiguous space may cause file 200B to become separated from the other files in the region, i.e., to become separated or fragmented from files 200A, 200C, and 200D. In one embodiment, the system may also reorganize one or more of these files as well, so that contiguousness of files in the region is preserved. For example, FIG. 5C illustrates that multiple files have been reorganized so that not only are the data blocks of file 200B contiguous, but file 200B is also contiguous with respect to the other files with which it was originally located.

In various embodiments, any of various criteria may be used to decide what constitutes a region of files and when the contiguousness of multiple files should be maintained. In one embodiment, a region of files may be defined by file system allocation policies. For example, in one embodiment the system may be operable to reorganize multiple files so that files that originally shared allocation units continue to remain contiguous with respect to each other after reorganization.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage medium storing program instructions executable to:
   receive an I/O request for accessing a first file stored on a storage device;
   in response to the I/O request, mark the first file for possible reorganization;
   in response to determining that the first file was marked for possible reorganization, determine whether the first file is in need of reorganization by checking the first file for fragmentation; and in response to determining that the first file is in need of reorganization, reorganize the first file, wherein said reorganizing comprises rearranging data blocks of the first file so that the data blocks are stored at contiguous storage locations of the storage device.

2. The storage medium of claim 1,
wherein the I/O request comprises a write request for writing to the first file.

3. The storage medium of claim 1,
wherein the I/O request comprises an allocating write request for allocating and writing new data blocks for the first file.

4. The storage medium of claim 1,
wherein said marking the first file for possible reorganization comprises storing information in a data structure representing the first file.

5. The storage medium of claim 1,
wherein said marking the first file for possible reorganization comprises setting a flag in an inode of the first file.

6. The storage medium of claim 1,
wherein said marking the first file for possible reorganization comprises adding the first file to a list of marked files.

7. A method comprising:
a computer system receiving an I/O request for accessing a first file stored on a storage device;
in response to the I/O request, the computer system marking the first file for possible reorganization;
in response to determining that the first file was marked for possible reorganization, the computer system determining whether the first file is in need of reorganization by checking the first file for fragmentation; and
in response to determining that the first file is in need of reorganization, the computer system reorganizing the first file, wherein said reorganizing comprises rearranging data blocks of the first file so that the data blocks are stored at contiguous storage locations of the storage device.

8. The method of claim 7,
wherein the I/O request comprises a write request for writing to the first file.

9. The method of claim 7,
wherein the I/O request comprises an allocating write request for allocating and writing new data blocks for the first file.

10. The method of claim 7,
wherein said marking the first file for possible reorganization comprises storing information in a data structure representing the first file.

11. The method of claim 7,
wherein said marking the first file for possible reorganization comprises setting a flag in an inode of the first file.

12. The method of claim 7,
wherein said marking the first file for possible reorganization comprises adding the first file to a list of marked files.

13. A system comprising:
memory storing program instructions;
wherein the program instructions are executable by the one or more processors to:
receive an I/O request for accessing a first file stored on a storage device;
in response to the I/O request, mark the first file for possible reorganization;
in response to determining that the first file was marked for possible reorganization, determine whether the first file is in need of reorganization by checking the first file for fragmentation; and
in response to determining that the first file is in need of reorganization, reorganize the first file, wherein said reorganizing comprises rearranging data blocks of the first file so that the data blocks are stored at contiguous locations of the storage device.

14. The system of claim 13,
wherein the I/O request comprises a write request for writing to the first file.

15. The system of claim 13,
wherein the I/O request comprises an allocating write request for allocating and writing new data blocks for the first file.

16. The system of claim 13,
wherein said marking the first file for possible reorganization comprises storing information in a data structure representing the first file.

17. The system of claim 13,
wherein said marking the first file for possible reorganization comprises setting a flag in an inode of the first file.

18. The system of claim 13,
wherein said marking the first file for possible reorganization comprises adding the first file to a list of marked files.

19. The storage medium of claim 13,
wherein said checking the first file for fragmentation comprises determining whether the first file is fragmented above a threshold level.

20. The method of claim 7,
wherein said checking the first file for fragmentation comprises determining whether the first file is fragmented above a threshold level.

21. The system of claim 13,
wherein said checking the first file for fragmentation comprises determining whether the first file is fragmented above a threshold level.

* * * * *